(12) United States Patent
Jang et al.

(10) Patent No.: US 12,149,120 B2
(45) Date of Patent: Nov. 19, 2024

(54) STATOR WITH SPLIT TEETH WITH COUPLING PORTION TO BACK YOKE

(71) Applicant: LG Electronics Inc., Seoul (KR)

(72) Inventors: Kwangyong Jang, Seoul (KR); Yongdae Kim, Seoul (KR); Jin Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 236 days.

(21) Appl. No.: 17/640,650

(22) PCT Filed: Jul. 24, 2020

(86) PCT No.: PCT/KR2020/009759
§ 371 (c)(1),
(2) Date: Mar. 4, 2022

(87) PCT Pub. No.: WO2021/045383
PCT Pub. Date: Mar. 11, 2021

(65) Prior Publication Data
US 2022/0360122 A1 Nov. 10, 2022

(30) Foreign Application Priority Data
Sep. 4, 2019 (KR) .......................... 10-2019-0109495

(51) Int. Cl.
*H02K 1/14* (2006.01)
*H02K 7/14* (2006.01)
*H02K 15/02* (2006.01)

(52) U.S. Cl.
CPC .............. *H02K 1/148* (2013.01); *H02K 7/14* (2013.01); *H02K 15/022* (2013.01); *H02K 2213/03* (2013.01)

(58) Field of Classification Search
CPC ............ H02K 1/165; H02K 1/16; H02K 1/14; H02K 1/148; H02K 2213/03; H02K 7/14; H02K 15/022
(Continued)

(56) References Cited

U.S. PATENT DOCUMENTS

| 4,912,353 A | * | 3/1990 | Kondo | ................... | H02K 1/148 |
| | | | | | 310/216.067 |
| 5,859,486 A | * | 1/1999 | Nakahara | ............... | H02K 1/148 |
| | | | | | 310/216.084 |

(Continued)

FOREIGN PATENT DOCUMENTS

| EP | 1602554 | 12/2005 | | |
| JP | H8116632 A | * | 1/1994 | ............. H02K 1/146 |

(Continued)

OTHER PUBLICATIONS

JPH08116632A English Translation.*
(Continued)

*Primary Examiner* — Maged M Almawri
(74) *Attorney, Agent, or Firm* — Fish & Richardson P.C.

(57) ABSTRACT

The present disclosure relates to a stator which prevents motor efficiency from deteriorating while increasing divided contact areas of divided teeth. According to the present disclosure, provided is a stator characterized by comprising a back yoke having a certain thickness in the radial direction, and divided teeth coupled to the back yoke, wherein: the back yoke includes recessed grooves into which the divided teeth fit; the divided teeth include a winding portion forming a section on which a coil is wound and a coupling portion extending from the winding portion and fitting into the grooves; and the length of the back yoke in the radial direction at the coupling portion is greater than half the thickness of the back yoke.

16 Claims, 7 Drawing Sheets

(58) Field of Classification Search
USPC .............. 310/433, 216.051, 216.069–216.88
See application file for complete search history.

(56) References Cited

U.S. PATENT DOCUMENTS

| | | | | |
|---|---|---|---|---|
| 7,348,706 B2* | 3/2008 | Ionel | ...................... | H02K 1/148 310/216.137 |
| 9,246,361 B2* | 1/2016 | Yang | ...................... | H02K 1/148 |
| 2003/0168926 A1 | 9/2003 | Zepp et al. | | |
| 2004/0021393 A1 | 2/2004 | Suzuki et al. | | |
| 2004/0070304 A1* | 4/2004 | Enomoto | ............. | H02K 15/022 310/216.088 |
| 2005/0200226 A1* | 9/2005 | Kim | ...................... | H02K 15/024 310/216.057 |
| 2009/0289522 A1* | 11/2009 | Buban | ................... | H02K 1/148 310/216.113 |
| 2011/0037338 A1* | 2/2011 | Leiber | ................. | H02K 15/022 310/216.105 |
| 2012/0007463 A1* | 1/2012 | Taniguchi | .............. | H02K 1/165 310/216.051 |
| 2012/0007464 A1* | 1/2012 | Saito | ...................... | H02K 1/276 29/598 |
| 2012/0058313 A1* | 3/2012 | Nagai | ...................... | H02K 1/16 228/178 |
| 2012/0112600 A1* | 5/2012 | Kondou | ................... | H02K 1/16 310/216.086 |
| 2012/0126659 A1* | 5/2012 | Jurkowski | .............. | H02K 1/146 310/216.074 |
| 2012/0275942 A1* | 11/2012 | Knapp | .................. | H02K 1/165 310/216.086 |
| 2013/0106214 A1* | 5/2013 | Chang | ................... | H02K 3/522 310/71 |
| 2013/0119816 A1* | 5/2013 | Yang | ........................ | H02K 1/24 310/216.007 |
| 2013/0200746 A1 | 8/2013 | Foulsham et al. | | |
| 2014/0152127 A1* | 6/2014 | Tang | ........................ | H02K 1/02 310/43 |
| 2015/0326076 A1* | 11/2015 | Kim | ........................ | H02K 1/24 310/216.086 |
| 2016/0329794 A1* | 11/2016 | Li | .......................... | H02K 1/146 |
| 2017/0163104 A1* | 6/2017 | Li | ........................ | H02K 1/2706 |
| 2018/0131245 A1* | 5/2018 | Hsu | ...................... | H02K 1/2788 |

FOREIGN PATENT DOCUMENTS

| | | |
|---|---|---|
| JP | H 08116632 | 5/1996 |
| JP | H1146462 A * | 1/1997 |
| JP | 2011097769 | 5/2011 |
| JP | 2012115124 | 6/2012 |
| JP | 2017118744 | 6/2017 |
| WO | WO 1990/04874 | 5/1990 |

OTHER PUBLICATIONS

International Search Report and Written Opinion in International Appln. No. PCT/KR2020/009759, dated Nov. 9, 2020, 15 pages (with English translation).

Extended European Search Report in European Appln. No. 20859886.2, mailed on Aug. 2, 2023, 10 pages.

* cited by examiner

STATOR WITH SPLIT TEETH WITH COUPLING PORTION TO BACK YOKE

CROSS-REFERENCE TO RELATED APPLICATIONS

This application is a National Stage application under 35 U.S.C. § 371 of International Application No. PCT/KR2020/009759, filed on Jul. 24, 2020, which claims the benefit of Korean Application No. 10-2019-0109495, filed on Sep. 4, 2019. The disclosures of the prior applications are incorporated by reference in their entirety.

TECHNICAL FIELD

Various embodiments of the present disclosure relate to a stator having an improved shape of a coupling structure between split teeth and a back yoke.

BACKGROUND ART

Generally, a motor is a device configured to generate a driving force due to an interaction between a stator and a rotor, and a stator and a rotor provided in a general motor have basically the same structure.

However, a motor is classified into various types depending on the principle whereby a rotor rotates due to the interaction between a stator and a rotor. In addition, a motor may be classified according to the type or number of phases of the power applied to a stator coil. Moreover, a motor may be classified according to the method of winding the stator coil. For example, there are a direct-current (DC) variable-voltage motor and an alternating current (AC) 3-phase induction motor.

In describing the general structure of the motor, the motor may include a shaft forming a rotating shaft, a rotor coupled to the shaft, and a stator fixed to an inner side of a housing, wherein the stator is installed at a predetermined distance from the circumference of the rotor.

In addition, the stator is provided with teeth, and a coil forming a rotating magnetic field is wound on the teeth so as to induce electrical interaction with the rotor to thereby induce rotation of the rotor.

Methods of winding the coil are classified into concentrated winding and distributed winding. Concentrated winding is a method of winding a coil on one slot, and distributed winding is a method of winding a coil on two or more slots.

In concentrated winding, copper loss can be reduced while the number of windings is reduced compared to distributed winding, but the change in magnetic flux density is large because the coil is excessively concentrated in one slot, and core loss or iron loss, that is, power loss from an iron core increases. For this reason, a coil wound by the concentrated winding method is generally used in a small motor.

In recent years, a motor used in various home appliances (e.g., a hair dryer, a vacuum cleaner, etc.) has adopted split teeth so as to enable easy winding of a coil in the motor, which is miniaturized, and the split teeth may be fixed using adhesive.

In the case of split teeth, since adhesive force should be increased to maintain rigidity, contact area on the teeth should be increased. However, particularly when the contact area is increased, output is decreased due to an increase in core loss.

Patent Document 1 (10-1135215, registered on Apr. 3, 2012) discloses split cores of an electric power system (EPS) motor stator capable of accurately maintaining concentricity during assembly and disassembly. Patent Document 2 (10-2002-0011819, published on Feb. 9, 2002) discloses a stator core in which a plurality of slots is formed in a back yoke, and teeth are fitted to the slots so as to be coupled to the back yoke based on a designer's intended purpose.

However, in the case of a small motor, since the thickness of a back yoke is small, it is difficult to adopt the structure in Patent Document 1, and since the shape of a bonding portion is complicated, manufacture of a mold and lamination may be difficult, making the back yoke weakly resistant to vibration. Moreover, in Patent Document 2, distribution of density of magnetic flux may vary depending on the number of slots.

Therefore, there is need for structural improvement of a stator capable of maintaining output of a motor while securing adhesive force by increasing the area of a bonding surface on the split teeth.

DISCLOSURE

Technical Task

One technical task of the present disclosure is to provide a stator having an improved structure capable of maintaining rigidity by increasing adhesive force of split teeth.

Another technical task of the present disclosure is to provide a stator that increases contact area on split teeth and prevents a decrease in the efficiency of a motor.

Another technical task of the present disclosure is to provide a stator in which a coil wound by a concentrated winding method is applied to split cores, and the split cores are coupled to a back yoke.

Another technical task of the present disclosure is to provide a stator that minimizes an area in a back yoke in which magnetic flux does not flow and prevents deterioration in rigidity at a bonding portion and a decrease in the efficiency of a motor.

Technical Solutions

In order to solve the various tasks in the present disclosure, an exemplary embodiment of the present disclosure provides a dimension ratio of a split core at which a bonding area and an efficiency of a motor are maximized.

Another task of the present disclosure is to provide a stator capable of increasing the rigidity between split teeth and a stator core by increasing an area of a bonding portion without reducing outputs.

Another task of the present disclosure is to provide a stator capable of increasing back electromotive force by maximizing an area of a bonding portion in a region where magnetic flux density is low so as to reduce leakage of magnetic flux.

According to an embodiment of the present disclosure, provided is a stator including a back yoke having a predetermined thickness in a radial direction, and split teeth coupled to the back yoke, wherein the back yoke may include recessed grooves into which the split teeth fit, wherein each of the split teeth may include a winding portion forming a section on which a coil is wound, and a coupling portion extending from the winding portion and fitting into the groove, and wherein the coupling portion may have a length in the radial direction of the back yoke greater than half the thickness of the back yoke.

The coupling portion may include radial portions extending from the winding portion in the radial direction of the back yoke, and a horizontal portion interconnecting the radial portions. Each of the radial portions may include a support portion extending from the winding portion in a first direction in which the winding portion is reduced in width, and a bonding portion extending from the support portion in a second direction, which is opposite the first direction, and the horizontal portion may be formed by interconnecting opposite ends of the bonding portion. Here, the bonding portion may have a largest width greater than a radial length of the coupling portion.

According to an embodiment of the present disclosure, provided is a stator including a back yoke having a thickness in a radial direction equal to a first length, and split teeth coupled to the back yoke, wherein the back yoke may form grooves therein, and each of the split teeth may include a coupling portion fitted into the groove, and wherein the coupling portion may have a thickness in the radial direction of the back yoke equal to a second length, and the second length may be 50% or more and less than 100% of the first length.

The coupling portion may have, at a portion thereof, a width equal to a third length, and the second length and the third length may form a predetermined ratio. The third length may correspond to 120% of the second length.

Each of the split teeth may further include a winding portion forming a section on which a coil is wound, the coupling portion may extend from the winding portion in the radial direction of the back yoke. The coupling portion may include radial portions extending from the winding portion in the radial direction of the back yoke, and a horizontal portion interconnecting the radial portions.

Each of the radial portions may include a support portion extending from the winding portion in a first direction in which the winding portion is reduced in width, and a bonding portion extending from the support portion in a second direction being opposite the first direction, wherein the horizontal portion may be formed by interconnecting opposite ends of the bonding portion, wherein the bonding portion may have a largest width equal to a third length, and wherein the second length and the third length may form a predetermined ratio.

The third length may correspond to 120% of the second length.

According to an embodiment of the present disclosure, provided is a stator including a back yoke having a thickness equal to a first length in a radial direction, and split teeth coupled to the back yoke, wherein the back yoke may include recessed grooves into which the split teeth fit, each of the grooves may be recessed by a second length from an inner circumferential surface of the back yoke in the radial direction of the back yoke, and the second length may be 50% or more and less than 100% of the first length.

The groove may have, at a portion thereof, a width equal to a third length, and the second length and the third length may form a predetermined ratio. Each of the split teeth may further include a coupling portion formed to protrude so as to correspond to the shape of the groove.

Features in each of the above-described embodiments may be combined in other embodiments as long as they are not contradictory or exclusive to each other.

Advantageous Effects

According to the present disclosure, the area of a bonding portion between split teeth and a back yoke increases, and at the same time, back electromotive force due to the decrease in magnetic flux saturation of the back yoke increases, thereby preventing a decrease in motor efficiency due to the increase in the area of the bonding portion.

In addition, according to the present disclosure, it may be possible to minimize an area in a back yoke in which magnetic flux does not flow and to increase the rigidity of a bonding portion.

Furthermore, according to the present disclosure, it may be possible to minimize a decrease in motor efficiency that occurs when the area of a bonding portion is increased.

BEST MODE FOR DISCLOSURE

Hereinafter, embodiments of the present disclosure will be described with reference to the drawings. The following detailed description is provided to aid in an overall understanding of the methods, devices and/or systems described herein. However, this is merely an example, and the present disclosure is not limited thereto.

In describing the present disclosure, if a detailed explanation of a related known function or construction is considered to unnecessarily obscure the gist of the present disclosure, such explanation will be omitted. In addition, terms to be described later are defined in consideration of functions in the present disclosure and may vary according to intentions of users and operators or customs. Therefore, the definition thereof should be made based on the entire content of the present specification. The terminology used in the description is merely for describing specific embodiments and is not intended to limit the embodiments. Singular forms are intended to also include the plural meaning, unless the context clearly dictates otherwise. In the description, expressions such as "including" or "provided with" are intended to refer to certain features, numbers, steps, acts, elements, or a combination thereof, and should not be construed to exclude the presence or possibility of one or more of other features, numbers, steps, acts, elements, or a combination thereof other than those described herein.

As used herein, terms such as "$1^{st}$" "$2^{nd}$" "A", "B", "a", and "b", may be used to describe components according to an embodiment of the present disclosure. These terms are intended to simply distinguish a corresponding component from another, and do not limit the components in other aspects, such as the features or order of corresponding components.

Figure 1:
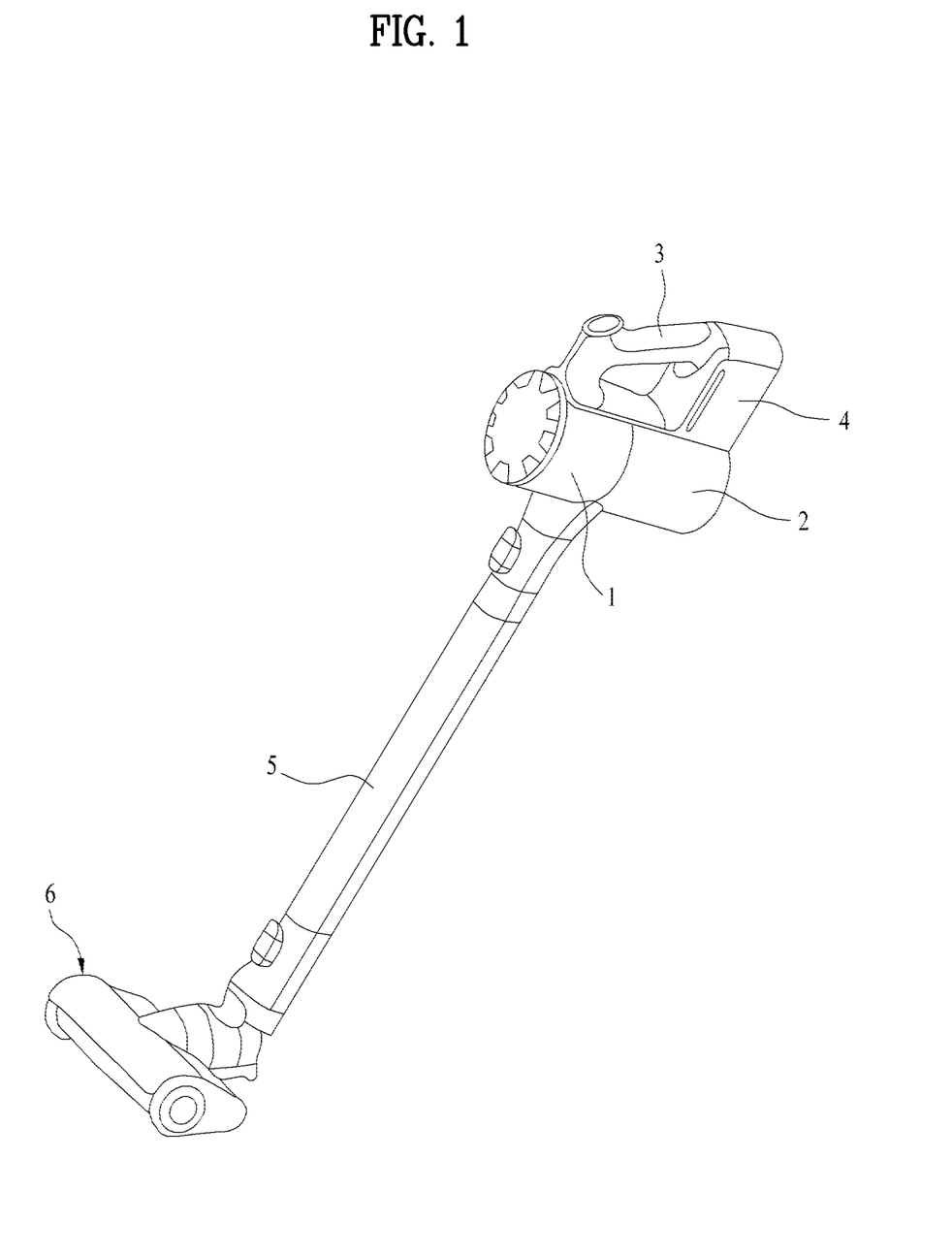
FIG. 1 is a perspective view of a vacuum cleaner.

FIG. 1 is a perspective view of a vacuum cleaner.

Referring to FIG. 1, the vacuum cleaner may include a cleaner body 1 provided with a motor configured to generate suction force, a suction nozzle 6 configured to suck air including dust, and an extension pipe 5 configured to connect the cleaner body 1 and the suction nozzle 6.

Meanwhile, although not shown, the suction nozzle 6 may be directly connected to the cleaner body 1 without the extension pipe 5.

The cleaner body 1 may include a dust container 2 in which dust separated from air is stored. As such, dust introduced through the suction nozzle 6 may be stored in the dust container 2 through the extension pipe 5.

The cleaner body 1 may be provided with a handle 3, which is to be held by a user. A user may perform cleaning while holding the handle 3.

The cleaner body 1 may be provided with a battery (not shown), and a battery accommodating portion 4 in which the battery (not shown) is accommodated. The battery accommodating portion 4 may be provided at a lower portion of the handle 3. The battery (not shown) may be connected to the suction nozzle 6 so as to supply power to the suction nozzle 6.

Figure 2:
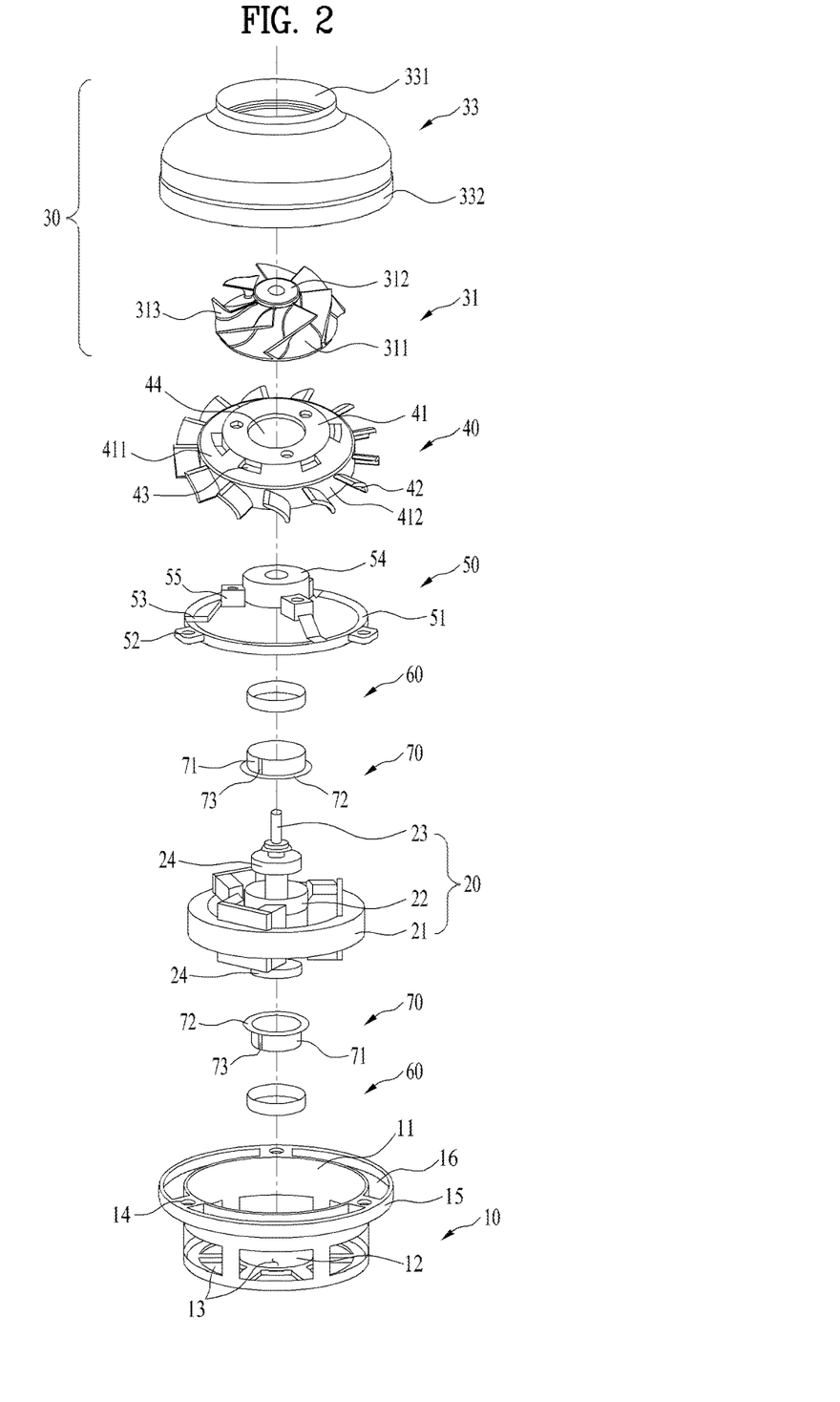
FIG. 2 is a view of the entire configuration of a motor to which an embodiment of the present disclosure is applied.

FIG. 2 is a view of the entire configuration of the motor to which an embodiment of the present disclosure is applied.

FIG. 2 explains the entire structure of the motor of this embodiment. A coupling portion between split teeth and a back yoke is described in FIGS. 3 to 7, and it will be understood that the features in FIGS. 3 to 7 are applicable to the entire configuration of FIG. 2.

Referring to FIG. 2, the motor includes a motor unit 20, a housing accommodating the motor unit 20 therein and defining the overall skeleton of the motor, a flow generator 30 installed on the upper portion of the housing so as to generate air flow, and a diffuser 40 configured to disperse the air flow generated by the flow generator 30.

The motor unit 20 includes a stator 21 having an annular shape, a shaft 23 passing through the center of the stator 21, and a rotor 22 installed on the shaft 23 and configured to generate rotational force using the stator 21. Here, the shaft 23 is rotatably supported by a bearing 24.

The motor unit 20 is exemplified as a brushless direct current (BLDC) motor. Although the drawing illustrates a structure in which the stator 21 is disposed outside the rotor 22 as a BLDC motor, this does not mean that a motor having a structure in which the stator 21 is disposed inside the rotor 22 is excluded.

Under the motor unit 20, there is provided a motor housing 10 so as to form a space for accommodating the motor unit 20. The motor housing 10 may include a motor installation portion 11 having the shape of a cylinder with an open top, a connection arm 14 extending outwards in a radial direction from the upper end of the motor installation portion 11, an annular body coupling portion 15 provided at an end of the connection arm 14 and having a diameter larger than that of the motor installation portion 11, and a bearing support portion 12 formed at the center of the bottom of the motor installation portion 11 so as to fix and support the bearing 24 under the motor unit 20.

The bearing 24 may be installed in the form of a bearing assembly in which a bearing holder 70 and an elastic mesh 60 are sequentially wound around the outer circumferential surface of the bearing 24.

A bracket 50, the diffuser 40, and the flow generator 30 may be provided above the motor unit 20. The flow generator 30 may include an impeller 31 and an impeller cover 33.

The bracket 50 may have a central portion 54 aligned with a hole 45 formed in the center of the diffuser 40, an annular support portion 51 having a wider radius than the central portion 54, and a connection portion 53 connecting the central portion 54 and the support portion 51.

In addition, the support portion 51 may be provided with a fastening portion 52 protruding in the radial direction so that the fastening portion 52 is coupled to the motor housing 10 so as to support the upper portion of the motor unit 20.

The diffuser 40 has the hole 45 formed in the central portion thereof, and a plurality of cooling passage outlets 43 is provided around the outer circumferential surface of the hole 45 so as to form a passage through which the heat generated in the motor unit 20 is discharged.

Meanwhile, a cylindrical portion 412, forming an outer diameter of the diffuser 40 corresponding to the outer diameter of the side wall of the motor installation portion 11, is formed along the radial direction of the diffuser 40, and a plurality of vanes 42 is provided along the outer circumferential surface of the cylindrical portion 412 so as to guide the flow of air pressurized by the impeller 31.

The impeller 31 is installed on the upper portion of the diffuser 40. The impeller 31 is provided, at the center thereof, with an axial mounting hole 312 into which the shaft 23 is inserted. The impeller 31 may be a mixed-flow type impeller having a structure in which the axial mounting hole 312 is formed in a hub 311 that supports the overall rigidity of the impeller 31, and the hub 311 has a downwardly sloping surface as it gets further away from the center of rotation in the radial direction and is provided with radial blades 312.

The impeller cover 33 may be formed, at an upper central portion thereof, with an air inlet 331, which is a passage through which air moves, and may be inclined downwards with respect to the air inlet 331. The impeller cover 33 may be formed, at a lower end thereof, with a cover-coupling portion 342 having a stepped shape so that the body coupling portion 15 is fitted into the stepped-shaped cover-coupling portion 342.

Figure 3:
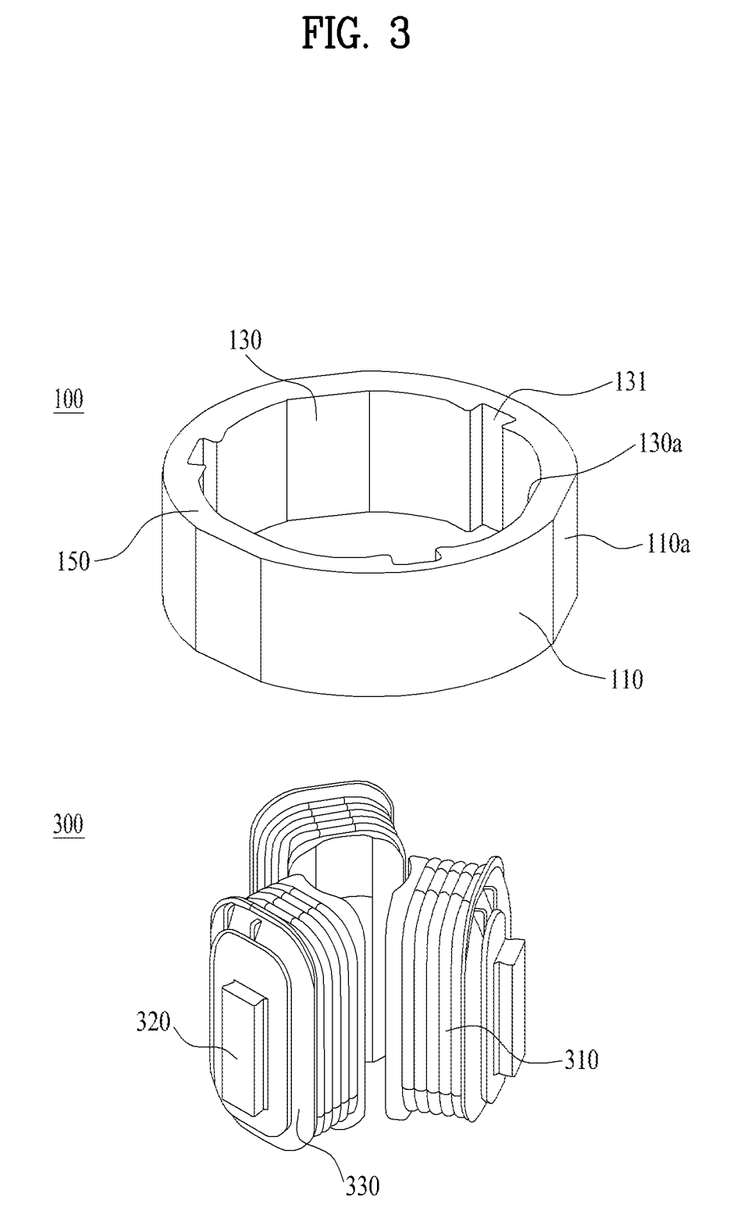
FIG. 3 is a perspective view of a stator according to an embodiment of the present disclosure.

FIG. 3 is a perspective view of the stator according to an embodiment of the present disclosure.

Referring to FIG. 3, this embodiment may include a stator core 100 forming a back yoke, and split cores 300 inserted into the stator core 100 in the axial direction.

In this embodiment, the concentrated winding is applied to the split teeth 320, and split cores, each of which has a tooth being inserted in the stator core 100 in the axial direction (longitudinal direction) of the stator core 100, are taken as an example. The reason for inserting the split teeth 320 in the axial direction of the stator core 100 is that, since the size of the stator core 100 is reduced due to miniaturization of the motor and spatial limitations caused by the miniaturization, it is difficult to couple the split cores to the back yoke of the stator in the radial direction of the motor.

In addition, since the stator core has a cylindrical shape, the meaning of the radial direction in this embodiment includes the radially outer and inner sides of the stator core. In this embodiment, the radial length may be a reference vector for the thickness of the back yoke, the extended length of the coupling portion, or the recessed length of the groove.

The stator core 100 may be provided in a cylindrical shape having a space therein, into which the split cores 300 are inserted. Portions of the inner and outer circumferential surfaces of the stator core 100 may be recessed inwards.

In other words, flat portions 110*a* and 130*a* may be formed at portions of the inner and outer circumferential surfaces of the stator core 100.

The flat portions 110*a* and 130*a* may reduce the thickness of the stator core 100 in the radial direction, thereby reducing the overall size of the motor. In addition, the flat portions 110a and 130a may remove part of a portion that may act as resistance to the magnetic flux flowing through the stator core 100, and as such, the performance of the motor may be improved.

Meanwhile, a portion of an inner circumferential surface 130 of the stator core 100 may be formed with one or more grooves 131 along the inner circumferential surface 130. A tooth 320 of each of the split cores 300 may be coupled to the groove 131 in the axial direction (the longitudinal direction of the stator core).

In other words, the split cores 300 of this embodiment are split cores each having a tooth. The tooth of each of the split cores 300 may be inserted into the stator core 100 with respect to an axis perpendicular to the radial direction of the stator core 100.

Moreover, the back yoke 150 of the stator core 100 may define a thickness W1 equal to the distance between the outer circumferential surface 110 and the inner circumferential surface 130 of the stator core 100, and the groove 131 may be recessed by a second length W2 from the inner circumferential surface 130 of the stator core 100. In addition, the tooth 320 may be fitted into the groove 131, and may then be fixed by bonding method.

Meanwhile, each of the split cores 300 may include an insulator 330, which surrounds the tooth 320 and insulates a coil 310 from the tooth 320.

The tooth 320 may include a coupling portion 323 coupled to the groove 131 in the stator core 100, a winding portion 321 extending from the coupling portion 323 in the radial direction of the back yoke, and a pole shoe portion extending from opposite sides of the winding portion 321 so as to form a magnetic circuit.

The insulator 330 surrounds the outer sides of the winding portion 321 and the pole shoe, and forms a section in which the coil 310 is wound.

The pole shoe extends from opposite sides of the winding portion 321 in a curved shape along a virtual circumferential surface inside the stator core 100. A lead wire of the coil 310 may be drawn out between the inner circumferential surface of the stator core 300 and the virtual circumferential surface in order to secure insulation performance.

Figure 4:
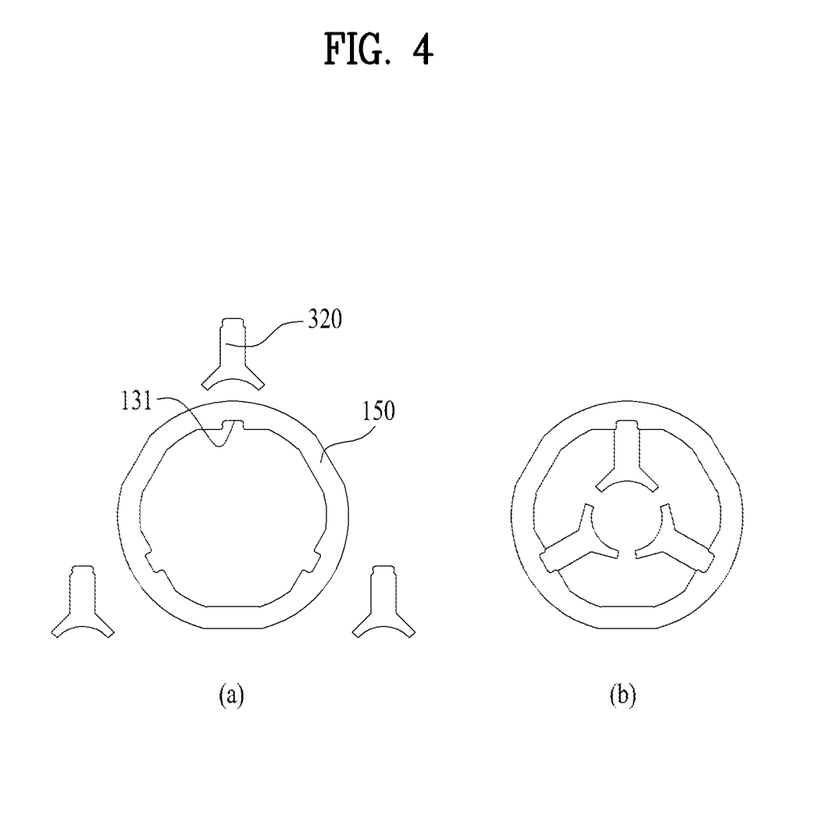
FIG. 4 is a top view of a stator core and split teeth in FIG. 3.
Figure 5:
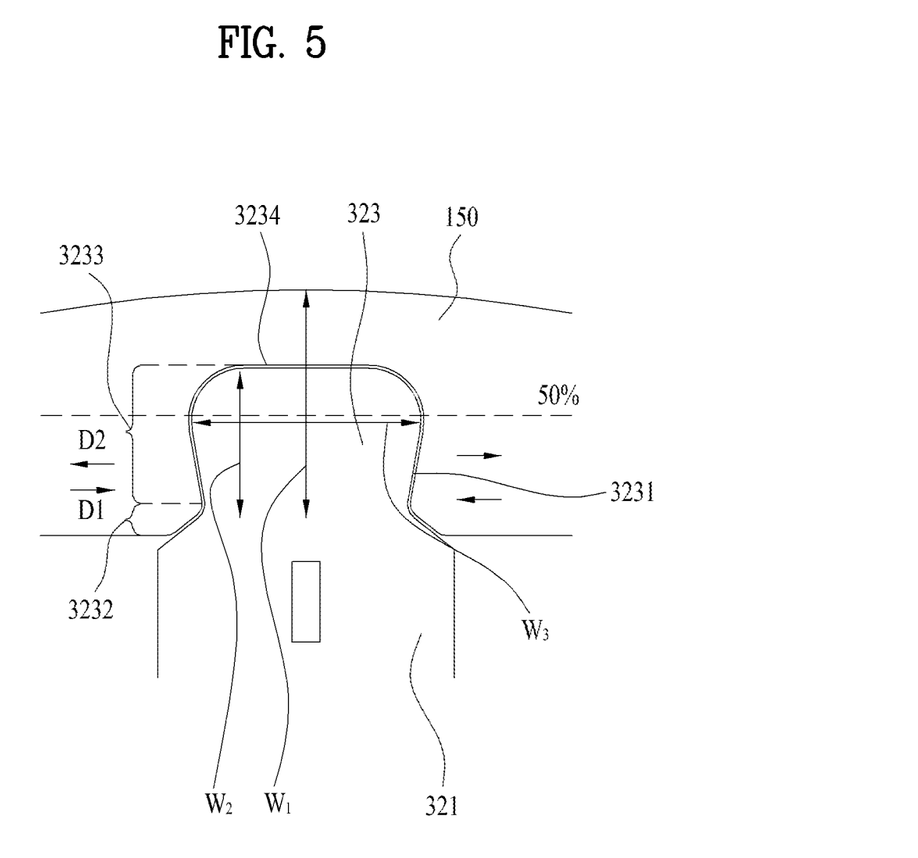
FIG. 5 is an enlarged view of a coupling portion at which one of the split teeth and a back yoke in FIG. 4 are coupled.

FIG. 4 is a top view of the stator core and split teeth in FIG. 3, and FIG. 5 is an enlarged view of the coupling portion at which one of the split teeth and the back yoke in FIG. 4 are coupled.

Referring to FIGS. 4 and 5, a stator of this embodiment includes a back yoke 150 having a predetermined thickness in a radial direction, and split teeth 320 coupled to the back yoke 150. The back yoke 150 may include recessed grooves 131 into which the split teeth 320 are fitted, and each of the split teeth 320 may include a winding portion 321 forming a section in which the coil 310 is wound, and a coupling portion 323 extending from the winding portion 321 and fitted into the groove 131. Here, the radial length W2 of the coupling portion 323 in the back yoke 150 may be greater than half the thickness W1 of the back yoke.

The coupling portion 323 may include radial portions 3231 extending from the winding portion 321 in the radial direction of the back yoke 150 and a horizontal portion 3234 interconnecting the radial portions 3231. Each of the radial portions 3231 may include a support portion 3232 extending from the winding portion 321 in a first direction D1, in which the width of the winding portion 321 is reduced, and a bonding portion 3233 extending from the support portion 3232 in a second direction D2, which is opposite the first direction D1. The horizontal portion 3234 may be formed by interconnecting opposite ends of the bonding portion 3233. Here, the largest width W3 of the bonding portion 3233 may be greater than the radial length W2 of the coupling portion 323.

The winding portion 321 may form a section in which the coil is wound, and may be formed, at opposite ends thereof, with the coupling portion 323 and the pole shoe, respectively.

The coupling portion 323 is a portion where the tooth 320 is fitted into the groove 131. Here, adhesive may be applied on the entire outer surface of the coupling portion 323 so as to fix the tooth 320 to the groove 131. However, it is not necessary to apply adhesive on the entire outer surface of the coupling portion 323. Instead, the tooth 320 may be fixed to the groove 131 after applying adhesive only on an area corresponding to the bonding portion 3233 of this embodiment.

In other words, the coupling portion 323 may include the bonding portion 3233, fixed to the groove in the back yoke by bonding method, and the support portion 3233, extending from the winding portion 321 in the first direction D1, in which the width of the winding portion is reduced. Here, the bonding portion 3233 may be formed to extend from the support portion 3233 in the second direction D2, which is opposite the first direction D1.

The first direction D1 and the second direction D2 may be directions in which the radial portion 3231 is bent with respect to the radial direction of the back yoke. The support portion 3232 and the bonding portion 3233 may correspond to a section in the radial portion 3231 that is bent and divided with respect to the first direction and the second direction.

Due to the bending formed by the support portion 3232, inclined in the first direction, and the bonding portion 3233, inclined in the second direction, removal of the tooth 320 by external force acting in the radial direction of the back yoke may be prevented.

Figure 6:
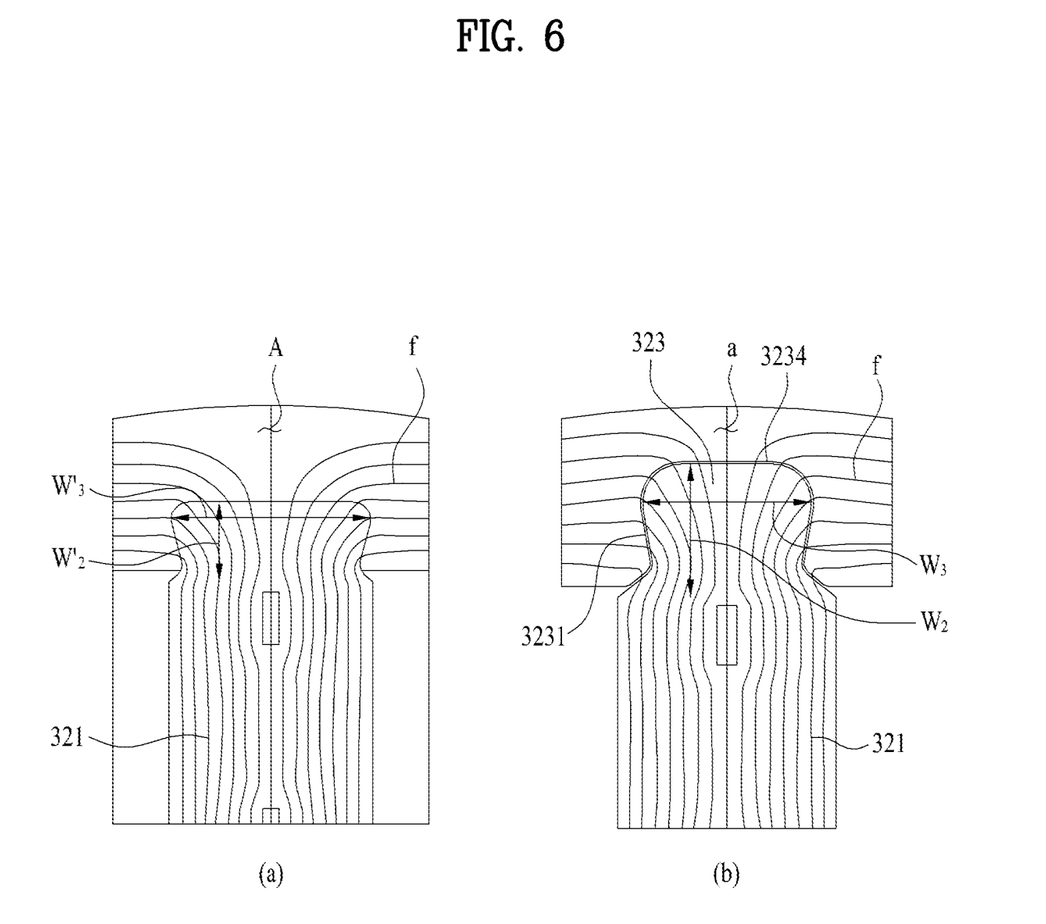
FIG. 6 is a view illustrating magnetic flux of a motor, which varies depending on the shape of the coupling portion.

FIG. 6 is a view illustrating the magnetic flux of the motor, which varies depending on the shape of the coupling portion. In detail, FIG. 6(a) is a view illustrating the magnetic flux flowing at a bonding portion between a conventional tooth and a conventional back yoke, and FIG. 6(b) is a view illustrating the magnetic flux flowing at the bonding portion between the tooth and the back yoke according to this embodiment.

Referring to FIG. 6, magnetic flux f flows through the back yoke and the tooth, and at this time, a portion of the back yoke 150 in the radial thickness direction may have an area A through which the magnetic flux f does not pass. When the thickness of the back yoke is reduced in order to reduce the area A, the rigidity of the back yoke 150 may be reduced. Conversely, when the thickness of the back yoke is increased in order to increase the rigidity of the back yoke 150, the area A may increase, thereby increasing unnecessary space consumption.

In other words, although the area A cannot be eliminated, the shape of the tooth, capable of minimizing the area A and maintaining the rigidity of the back yoke and the bonding force between the tooth and the back yoke, is as described above.

Figure 7:
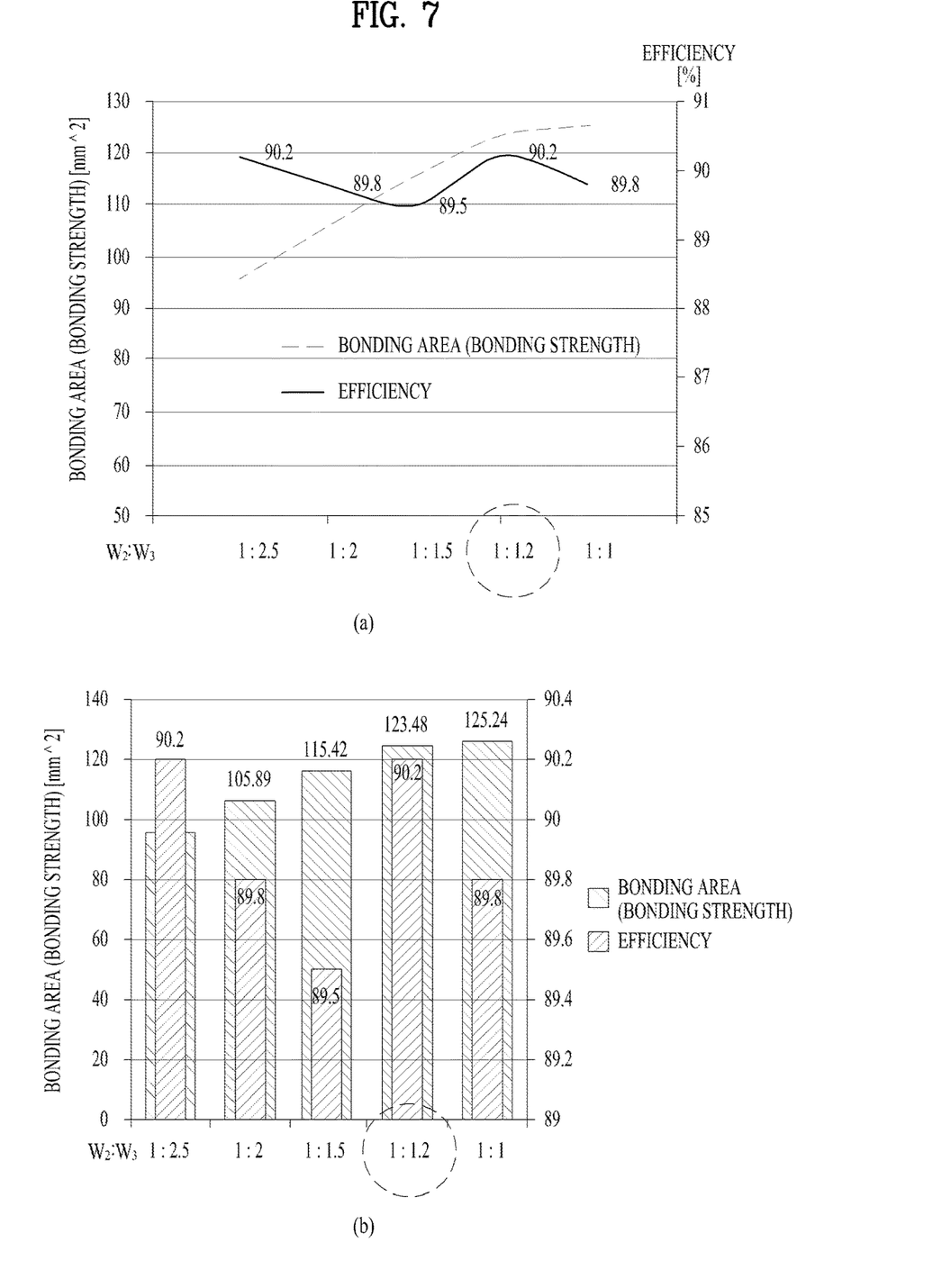
FIG. 7 is a graph showing the bonding strength and the efficiency of the motor depending on the shape ratio of the coupling portion.

FIG. 7 is a graph showing the bonding strength and the efficiency of the motor depending on the shape ratio of the coupling portion, and FIG. 8 is a graph showing the area of the coupling portion, back electromotive force, and efficiency depending on the shape of the coupling portion in FIG. 6.

The thickness of the back yoke may define a first length W1 from the outer circumferential surface 110 to the inner circumferential surface 130 of the stator core. The thickness of the coupling portion 323 may be defined as a second length W2 such that the radial portion 3231 extends from the winding portion 321 by the second length W2 in the radial direction of the back yoke. A portion of the width of the radial portion 3231 in the coupling portion 323 may define a third length W3.

The second length W2 may be greater than half the first length W1, and may form a predetermined ratio with the third length W3. The predetermined ratio may be a ratio at which the third length W3 corresponds to 120% of the second length W2.

In other words, the second length W2, which is the thickness of the coupling portion 323 of this embodiment, may fall within a range greater than 50% of the first length W1 and smaller than the first length W1. The ratio of the second length W2 to the third length W3 may be W2:W3=1:1.2.

FIG. 7(a) is a line graph showing the strength and efficiency of the bonding area depending on the ratio of the second length W2 to the third length W3, and FIG. 7(b) is a bar graph showing the same information as in FIG. 7(a).

In the graph, as the ratio of the second length W2 to the third length W3 approaches 1:1, the bonding strength increases, the efficiency of the motor decreases from a ratio of 1:2.5 to a ratio of 1:1.5, and then at a ratio of 1:1.2, it shows the same efficiency as the efficiency at the ratio of 1:2.5, and then decreases again as the ratio approaches 1:1.

In more detail, the ratio of the radial thickness W'2 of the coupling portion to the width W'3 of the coupling portion in FIG. 6(a) is 1:2.5, and this ratio corresponds to the left one on the x-axis of the graph in FIG. 7. Here, referring to FIG. 8, the area of the bonding portion is 95.78 mm^2, the back electromotive force (BEMF) is 13.9 Vrms, and the efficiency is 90.2%.

The ratio of the second length W2, which is the radial thickness of the coupling portion of this embodiment, to the third length W3, which is the width of the coupling portion, is 1:1.2. Here, referring to FIG. 8, the area of the bonding portion is 123.48 mm^2, the back electromotive force (BEMF) is 13.9 Vrms, and the efficiency is 90.2%.

In other words, in a region where the magnetic flux density is low, the area of the bonding portion is maximized using the above ratio of this embodiment, so that the leakage magnetic flux is reduced, thereby preventing decreases in back electromotive force and in efficiency.

Meanwhile, according to an embodiment of the present disclosure, in a stator including a back yoke 150 having a thickness equal to a first length W1 in a radial direction and split teeth 320 coupled to the back yoke 150, the back yoke 150 may include recessed grooves 131 into which the split teeth 320 are fitted, wherein each of the grooves 131 may be recessed in the radial direction by a second length W2 from an inner circumferential surface 130 of the back yoke 150, and the range of the second length W2 to the first length W1 may be 50% or more and less than 100% thereof.

In other words, the groove 131 may be recessed by a depth that is greater than half the thickness of the back yoke 150 and smaller than the thickness of the back yoke 150.

A portion of the groove 131 may form a width equal to a third length W3, and the second length W2 and the third length W3 may form a predetermined ratio (1:1.2). Here, the third length W3 may be the maximum width in the bonding portion.

In addition, a coupling portion 323 corresponding to the shape of the groove 131 may be formed to extend from a winding portion 321 of the tooth 320 so as to allow the tooth 320 to be coupled and fixed to the stator core 100.

Representative embodiments of the present disclosure have been described above in detail. However, those of ordinary skill in the art to which the present disclosure pertains will understand that various modifications to the above-described embodiments are possible within the limits without departing from the scope of the present disclosure. Therefore, the scope of the present disclosure should not be limited to the described embodiments, but should be determined by the scope of the appended claims and equivalents thereof.

What is claimed is:

1. A stator comprising:
a back yoke having a radial thickness in a radial direction of the stator; and
split teeth coupled to the back yoke,
wherein the back yoke defines grooves that receive the split teeth, respectively,
wherein each of the split teeth comprises:
a winding portion on which a coil is wound, and
a coupling portion that extends from the winding portion in the radial direction and is inserted into one of the grooves,
wherein the coupling portion comprises radial portions that extend from the winding portion in the radial direction of the back yoke,
wherein each of the radial portions comprises:
a support portion that extends from the winding portion along a first direction inclined with respect to the radial direction such that a width of the support portion decreases along the radial direction, and
a bonding portion that extends from the support portion along a second direction inclined with respect to the first direction such that a width of the bonding portion increases along the radial direction,
wherein the width of the bonding portion is greater than the width of the support portion to thereby reduce an area that blocks magnetic flux between the bonding portion and an outer circumferential surface of the back yoke, and
wherein a radial length of the coupling portion in the radial direction is greater than a half of the radial thickness of the back yoke.

2. The stator according to claim 1, wherein the coupling portion further comprises
a horizontal portion that connects the radial portions to each other.

3. The stator according to claim 2,
wherein the horizontal portion connects ends of the bonding portions of the radial portions to each other.

4. The stator according to claim 3, wherein an inclination angle of the support portion with respect to the radial direction is greater than an inclination angle of the bonding portion with respect to the radial direction.

5. The stator according to claim 3, wherein the radial length of the coupling portion is a sum of a radial length of the support portion and a radial length of the bonding portion in the radial direction, and
wherein the radial length of the bonding portion is greater than the radial length of the support portion.

6. A stator comprising:
a back yoke having a first thickness in a radial direction of the stator; and
split teeth coupled to the back yoke, each of the split teeth comprising:
  a coupling portion, and
  a winding portion on which a coil is wound,
wherein the back yoke defines grooves, each of the grooves receiving the coupling portion of one of the split teeth,
wherein the coupling portion comprises radial portions that extend from the winding portion in the radial direction of the back yoke,
wherein each of the radial portions comprises:
  a support portion that extends from the winding portion along a first direction inclined with respect to the radial direction such that a width of the support portion decreases along the radial direction, and
  a bonding portion that extends from the support portion along a second direction inclined with respect to the first direction such that a width of the bonding portion increases along the radial direction,
wherein the width of the bonding portion is greater than the width of the support portion to thereby reduce an area through which magnetic flux does not pass between the bonding portion and an outer circumferential surface of the back yoke, and
wherein the coupling portion has a second thickness in the radial direction, the second thickness being less than the first thickness and greater than or equal to a half of the first thickness.

7. The stator according to claim 6, wherein a width of a portion of the coupling portion is 120% of the second thickness.

8. The stator according to claim 6, wherein a distance between the bonding portions of the radial portions defines a largest width of the coupling portion, and
  wherein the largest width of the coupling portion defines a predetermined ratio with respect to the second thickness.

9. The stator according to claim 6, wherein a distance between the bonding portions of the radial portions is 120% of the second thickness.

10. The stator according to claim 6,
  wherein the coupling portion extends from the winding portion in the radial direction.

11. The stator according to claim 10, wherein the coupling portion further comprises:
  a horizontal portion that connects the radial portions to each other.

12. The stator according to claim 11,
  wherein the horizontal portion connects ends of the bonding portions of the radial portions to each other.

13. A stator comprising:
a back yoke having a first thickness in a radial direction; and
split teeth coupled to the back yoke,
wherein the back yoke defines grooves that receive the split teeth, respectively,
wherein each of the grooves is recessed from an inner circumferential surface of the back yoke in the radial direction,
wherein a recess depth of each of the grooves is less than the first thickness and greater than or equal to a half of the first thickness,
wherein each of the split teeth comprises:
  a winding portion on which a coil is wound, and
  a coupling portion that extends from the winding portion in the radial direction and is inserted into one of the grooves,
wherein the coupling portion comprises radial portions that extend from the winding portion in the radial direction of the back yoke,
wherein each of the radial portions comprises:
  a support portion that extends from the winding portion along a first direction inclined with respect to the radial direction such that a width of the support portion decreases along the radial direction, and
  a bonding portion that extends from the support portion along a second direction inclined with respect to the first direction such that a width of the bonding portion increases along the radial direction, and
wherein the width of the bonding portion is greater than the width of the support portion to thereby reduce an area through which magnetic flux does not pass between the bonding portion and an outer circumferential surface of the back yoke.

14. The stator according to claim 13,
wherein the coupling portion further comprises a horizontal portion that connects the radial portions to each other.

15. The stator according to claim 14,
wherein the horizontal portion connects ends of the bonding portions of the radial portions to each other.

16. The stator according to claim 15, wherein the recess depth corresponds to a sum of a radial length of the support portion and a radial length of the bonding portion in the radial direction, and
wherein the radial length of the bonding portion is greater than the radial length of the support portion.

* * * * *